United States Patent [19]

Kane et al.

[11] Patent Number: 5,754,292
[45] Date of Patent: May 19, 1998

[54] METHOD AND APPARATUS FOR MEASURING THE INTENSITY AND PHASE OF AN ULTRASHORT LIGHT PULSE

[75] Inventors: Daniel J. Kane, Santa Fe, N. Mex.; Rick P. Trebino, Livermore, Calif.

[73] Assignees: The Regents of the University of California; Sandia National Laboratory, both of Los Alamos, N. Mex.

[21] Appl. No.: 966,644

[22] Filed: Oct. 26, 1992

[51] Int. Cl.$^6$ .................................................. G01B 9/02
[52] U.S. Cl. .................................... 356/345; 356/353
[58] Field of Search .................................. 356/354, 345, 356/347, 351, 353

[56] References Cited

U.S. PATENT DOCUMENTS 4,792,230 12/1988 Naganuma .............................. 356/345

OTHER PUBLICATIONS

Malcolm Gower, "Phase Conjugate Mirrors," Tutorial T8 pp. 1–5.
Rick Trebino et al., "Chirp and Self Phase Modulation in Induced Grating Autocorrelation Measurements of Ultrashort Pulses," 15 Opt. Lett. No. 19, pp. 1079–1081 (October 1990).
Rick Trebino et al., "Forth Order Partial Coherence Effects in the Formation of Integrated Intensity Gratings w/Pulsed Light Sources," 3 J. Opt. Soc. Am. B, pp. 1295–1304 (Oct. 1986).
Jean Paul Foing et al., "Femtosecond Pulse Phase Measurement by Spectrally Resolved Up Conversion: Appl. to Continuum Compression," 28 IEEE J. Quantum Electron., No. 10, pp. 2285–2290.
A. Brun et al., "Single–shot Characterization of Ultrashort Light Pulses," 24 J. Phys. D: Appl. Phys., pp. 1225–1233 (1991).
H. J. Eichler et al., *Laser–Induced Dynamic Gratings*, Springer–Verlag, New York (1988), pp. 1–37.
Juan L. A. Chilla et al., "Direct Determination of the Amplitude and the Phase of Femtosecond Light Pulses," 16 Opt. Lett., No. 1, pp. 39–41 (1991).

*Primary Examiner*—Samuel A. Turner
*Attorney, Agent, or Firm*—Ray G. Wilson

[57] ABSTRACT

The pulse shape I(t) and phase evolution x(t) of ultrashort light pulses are obtained using an instantaneously responding nonlinear optical medium to form a signal pulse. A light pulse, such as a laser pulse, is split into a gate pulse and a probe pulse, where the gate pulse is delayed relative to the probe pulse. The gate pulse and the probe pulse are combined within an instantaneously responding optical medium to form a signal pulse functionally related to a temporal slice of the gate pulse corresponding to the time delay of the probe pulse. The signal pulse is then input to a wavelength-selective device to output pulse field information comprising intensity vs. frequency for a first value of the time delay. The time delay is varied over a range of values effective to yield an intensity plot of signal intensity vs. wavelength and delay. In one embodiment, the beams are overlapped at an angle so that a selected range of delay times is within the intersection to produce a simultaneous output over the time delays of interest.

19 Claims, 5 Drawing Sheets

METHOD AND APPARATUS FOR MEASURING THE INTENSITY AND PHASE OF AN ULTRASHORT LIGHT PULSE

BACKGROUND OF THE INVENTION

This invention relates to the measurement of parameters for ultrashort pulses and, more particularly, to the measurement of data that directly yields the pulse shape and phase of ultrashort light pulses. This invention is the result of a contract with the Department of Energy (Contract No. W-7405-ENG-36).

The generation of ultrashort laser pulses, i.e., laser pulse widths shorter than a few picoseconds, has been under development for some time and it is now possible to obtain ultrashort pulses over a relatively wide range of wavelengths. Measurement techniques to characterize these ultrashort pulses has not developed accordingly, however. The problem is difficult because the durations of ultrashort pulses are much less than the temporal resolution of available measuring devices. Early characterization techniques generated an intensity autocorrelation only, and later developments have allowed the determination of various phase distortions common to ultrashort pulses by, for example, such methods as interferometric autocorrelations or degenerate-four-wave mixing processes.

In a classic autocorrelator, an incoming laser pulse is split into two identical pulses. The two pulses arrive at a doubling crystal at the same time and intersect to output second harmonic light. The intensity of the second harmonic light is measured as a function of delay between the two pulses. This yields an intensity autocorrelation. An interferometric autocorrelation can be produced when the delay is stepped at a fraction of a wavelength while the device is stable and the fringes are observed.

Neither intensity autocorrelation nor interferometric autocorrelation provides either the pulse intensity or the phase of the pulse, however. Further, stability of interferometric autocorrelation to less than one wavelength of light is required. Special materials are required to generate the second harmonic output and available materials limit the technique to regions above 400 nm in wavelength. Finally, autocorrelation provides only a very approximate indication of the pulse width and phase information is not available to extract any additional information from the autocorrelation. Interferometric autocorrelation does give some phase information, but cannot, for example, distinguish positive from negative chirp.

A recent development reported by J. L. A. Chilla et al., "Direct Determination of the Amplitude and the Phase of Femtosecond Light Pulses," 16 Opt. Lett., No. 1, pp. 39–41 (1991), provides a method for directly obtaining the pulse shape and phase in the frequency domain. The method involves frequency-filtering the pulse and cross-correlating the filtered pulse with the shorter unfiltered pulse, yielding the time vs. frequency, which is integrated to yield the phase vs. frequency. This result, in conjunction with the spectrum, is the pulse field in the frequency domain. Fourier transformation then yields the intensity and phase in the time domain. While the disclosed method does provide structural information on ultrashort pulses, the method is complex and time-consuming to perform and requires multiple pulses to develop the required information.

Yet another technique for characterization of single ultrashort pulses is reported by A. Brun et al., "Single-shot Characterization of Ultrashort Light Pulses," 24 J. Phys. D: Appl. Phys., pp. 1225–1233 (August 1991). A beam splitter produces two replicas of the incident pulse. In one embodiment, one of the beams is focused in a water cell to output a pulse with a continuum chirp, i.e., different frequencies are distributed along the continuum temporal profile. This continuum pulse is then linearly polarized and combined with the other beam in a Kerr medium to transform the temporal modulation of the pulse into a spectral modulation. A spectrograph converts the wavelength-encoded temporal information to the spatial domain for readout. While spatial information may be obtained for a single pulse, multiple pulses are needed to first characterize the continuum. Further, a portion of the continuum having a linear chirp must be used. A variety of pump pulse delays were used to verify that the measured response was only slightly dependent on delay so long as the chirp was generally linear over the central wavelength selected for beam crossing. A good approximation of the ultrashort light pulse temporal shape is reported, but this method did not produce phase information.

Accordingly, it is an object of the present invention to obtain intensity and phase information of an ultrashort light pulse using direct measurement techniques.

It is another object of the present invention to obtain intensity and phase information of an ultrashort pulse using spectrally resolved nonlinear optical spectroscopy techniques.

One other object of the present invention is to obtain intensity and phase information of single ultrashort pulse.

Yet another object of the present invention is to obtain an intuitive display that embodies phase and intensity characteristics of ultrashort pulses.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention may comprise a method and apparatus to directly obtain intensity and phase information of an ultrashort light pulse. An input light pulse is formed into a probe pulse. A gate pulse is provided with a variable delay relative to the probe pulse. The gate pulse and the probe pulse are then combined in an instantaneously responding nonlinear medium to form a signal pulse representing the probe pulse characteristics at a time functionally related to the delay of the gate pulse to provide a series of temporal slices of the probe pulse. A spectrometer receives the output pulse to generate an intensity signal as a function of delay and wavelength.

In one embodiment, the gate pulse is delayed with various values to provide an intensity plot of signal intensity vs. wavelength and gate pulse delay. In another embodiment, the gate pulse and probe pulse are propagated through the nonlinear element at an angle to output a linear spatial signal having a range of gate pulse delay times that directly yields the plot of signal intensity vs. wavelength and gate pulse delay on a single pulse.

BRIEF DESCRIPTION OF THE DRAWINGS

The accompanying drawings, which are incorporated in and form a part of the specification, illustrate embodiments

3 of the present invention and, together with the description, serve to explain the principles of the invention. In the drawings.

DETAILED DESCRIPTION OF THE DRAWINGS

The present invention provides a method, referred to herein as a frequency-resolved optical grating (FROG), to directly determine the intensity and phase of an ultrashort light pulse. FROG acts to provide an output signal or display related to the spectrogram of the pulse. FROG then uses phase retrieval techniques to obtain the intensity, I(t), and phase, $\phi(t)$, of the pulse. Two pulses are combined in a nonlinear optical medium: one variably delayed pulse acts as a gate pulse and the pulse to be measured is the probe pulse which is gated by the gate pulse in the nonlinear optical medium. The resulting signal-pulse electric field for an optical Kerr effect embodiment is given by $$E_{sig}(t,\tau) \propto E(t)|E(t-\tau)|^2; \text{ or}$$

$$\alpha E(t)^2 E^*(t-\tau); \text{ or}$$

other nonlinear optical responses.

The output signal spectrum is then a function of the delay between the two input pulses, i.e., a series of temporal slices of the probe pulse. The measured signal, $I_{FROG}$, is a function of frequency, $\omega$, and delay, $\tau$:

$$I_{FROG}(\omega,\tau) \propto |\int E_{sig}(t,\tau) \exp(-i\omega t) dt|^2. \quad (1)$$

The full pulse field is essentially uniquely determined by the FROG output, even for pathological pulse shapes and/or phases, as shown by rewriting Equation (1) as a two-dimensional phase retrieval problem:

$$I_{FROG}(\omega,\tau) \propto |\iint E_{sig}(t,\Omega) \exp(-i\omega t - i\Omega\tau) dt d\Omega|^2. \quad (2)$$

where $E_{sig}(t,\Omega)$ is the one-dimensional Fourier transform of $E_{sig}(t,\tau)$ with regard to the delay variable, $\tau$. Thus, unique solutions for $E_{sig}(t,\Omega)$ exist in essentially all cases. In addition, it is straightforward to obtain E(t) from $E_{sig}(t,\tau)$:

$$E(t) \propto \epsilon \int E_{sig}(t,\tau) d\tau, \quad (3)$$

where $\epsilon$ is inversely proportional to the pulse energy per unit area, a constant. Slightly different expressions may result for E(t) for different nonlinear effects or geometries.

4

While a variety of ways exist to find E(t) from $E_{sig}(\Omega,\tau)$, a phase-retrieval algorithm is the preferred method. Such algorithms require a constraint of some nature. Here, the form of the signal field $E_{sig}(t,\tau)$ is a constraint on the solution. Thus, an estimate for $E_{sig}(t,\tau)$ gives an estimate for E(t), which can then be used to give a new estimate for $E_{sig}(t,\tau)$.

In a preferred form of solution, a simple iterative one dimensional Fourier-transform algorithm is used and involves Fourier transforming back and forth between $E_{sig}(t,\tau)$ and $E_{sig}(\omega,\tau)$. In the $\omega$-domain, the magnitude of Equation (2) is replaced with the square root of $I_{FROG}(\omega,\tau)$. The above constraint on the form of the signal field is used in the t-domain, generating the (k+1)st iteration for $E_{sig}(t,\tau)$ by first setting:

$$E(t)^{(k+1)} = \int E_{sig}^{(k)}(t,\tau) d\tau. \quad (4)$$

Using $E_{sig}(t,\tau) \propto E(t)|E(t-\tau)|^2$, the (k+1)st iteration for $E_{sig}(t,\tau)$ is constructed:

$$E_{sig}^{(k+1)}(t,\tau) = E^{(k+1)}(t)|E^{(k+1)}(t-\tau)|^2. \quad (5)$$

The application of the iterative algorithm shown in Equations (4) and (5) requires an initial "guess" for E(t). The preferred initial guess $E^{(0)}(t)$ for all cases has been found to be noise. The initial guess is input to Equation (5) to derive an $E^{(0)}_{sig}(t,\tau)$. A one dimensional Fourier transform is then performed to provide $E^{(0)}_{sig}(\omega,\tau)$. The magnitude of $E^{(0)}_{sig}(\omega,\tau)$ is then replaced with the square root of the detected signal $I_{FROG}(\omega,\tau)$ and the resulting $E'^{(0)}_{sig}(\omega,\tau)$ is inverse transformed to provide $E'^{(0)}_{sig}(t,\tau)$ for input to Equation (4) to form $E^{(1)}(t)$. The iterations continue until the results converge.

An alternative initial guess can be produced in the following manner. The approximate pulse time vs. frequency, $t(\omega)$, is given by:

$$t(\omega) \propto \int \tau I_{FROG}(\omega,\tau) d\tau \quad (6)$$

Integration of $t(\omega)$ yields the approximate pulse phase vs. frequency, $\psi(\tau)$. The pulse spectrum, I($\omega$), is also naturally obtained by FROG, either precisely by a separate and simultaneous measurement or approximately by integrating $I_{FROG}(\omega,\tau)$ with respect to $\tau$ and deconvolving out the intensity autocorrelation. These results yield the approximate full amplitude and phase of the pulse field in the frequency domain, E($\omega$). Fourier transformation then yields an approximate result for E(t). Generally, however, noise provides an initial guess that rapidly converges to a pulse shape using Equation (5) and a more precise guess is not necessary.

Figures 1, 2:
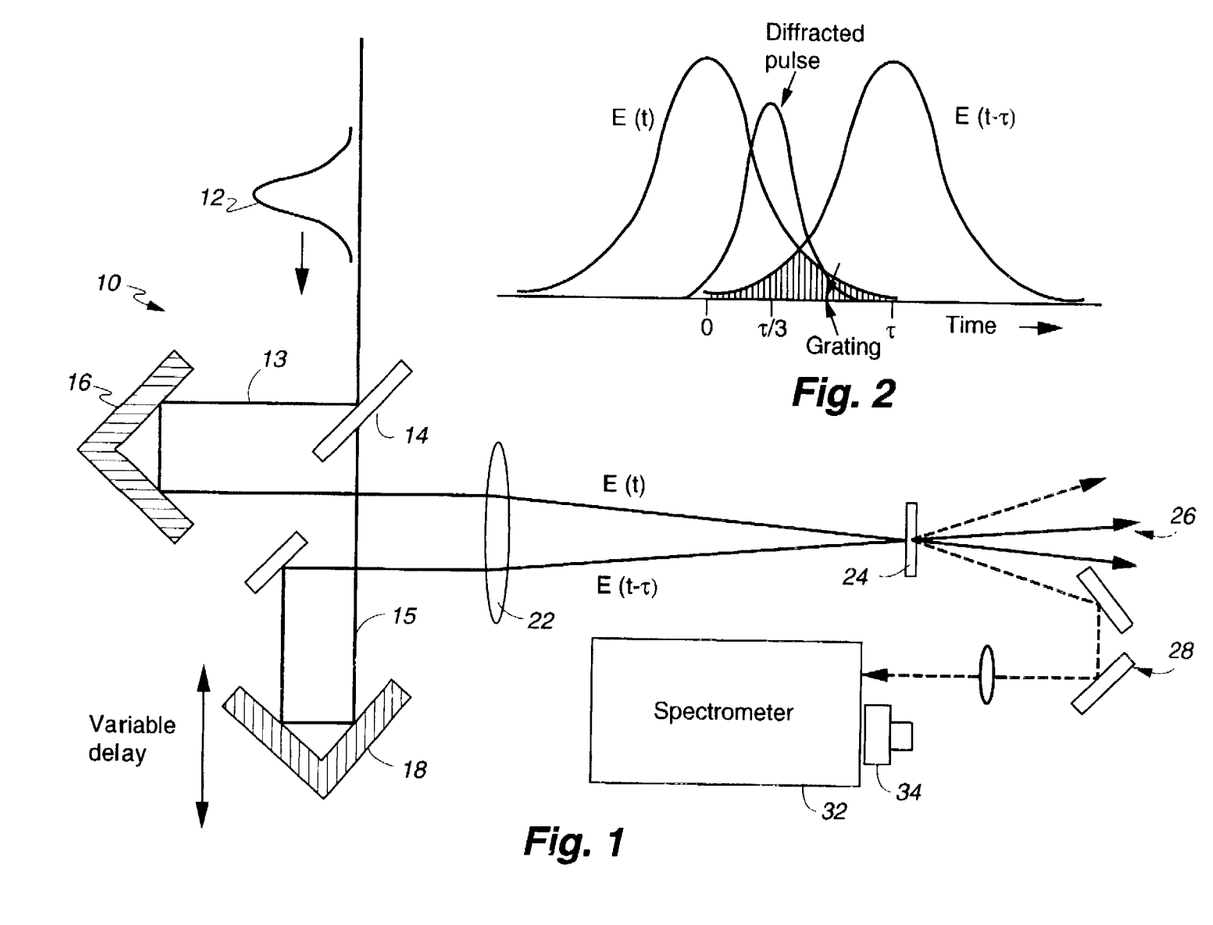
FIG. 1 schematically illustrates an ultrashort pulse characterizing device according to one embodiment of the present invention.
FIG. 2 graphically depicts the sampled pulse output from the nonlinear medium.

One embodiment of FROG apparatus 10 is shown in FIG. 1. An ultrashort light pulse 12 is input to beam splitter 14 to form probe pulse 13 and gate pulse 15. Probe pulse 13 is directed by optical alignment system 16 through lens 22 into instantaneously responding nonlinear medium 24. Gate pulse 15 is provided with a variable delay $\tau$ by delay 18. The probe pulse and the gate pulse are focused into nonlinear medium 24 through lens 22. Thus, beams having electric fields E(t) and E(t-$\tau$) intersect in nonlinear medium 24.

The interaction of two laser beams in a nonlinear medium is well known, e.g., H. J. Eichler et al., *Laser-Induced Dynamic Gratings*, Springer-Verlag, N.Y. (1988). The interaction of the beams produces an induced grating in the medium so that an incident probe beam, E(t), can be diffracted by a gating beam, E(t-τ), during the period of beam coincidence. Thus, only a temporal slice of the probe beam may be selected by the gating beam as graphically shown in FIG. 2. For not-too-pathological pulse shapes, the gate will be centered at and have maximum strength at about the time (τ/2), i.e., the midpoint between pulse peaks. The probe pulse will typically have an intensity gradient at this time, however, so the component of the probe pulse contributing the most intensity to the diffracted pulse will be at ≈τ/3 (an exact result for Gaussian-intensity pulses). The instantaneous frequency of the probe pulse is selected at that time, as a result.

Figure 3A:
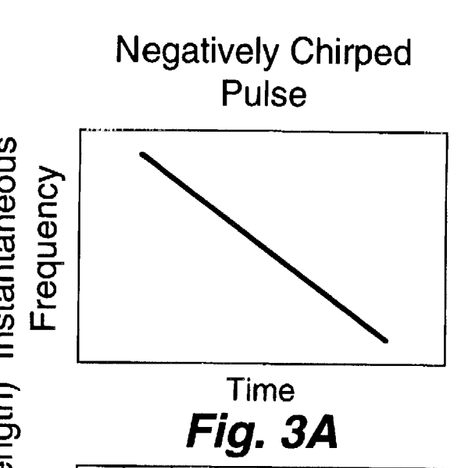
FIGS. 3A–3F pictorially shows the optical record of the intensity plot of frequency vs. time delay for various input pulse characteristics.
Figure 3B:
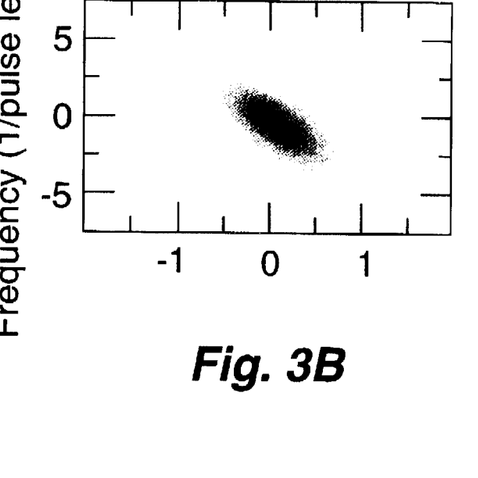
Figure 3C:
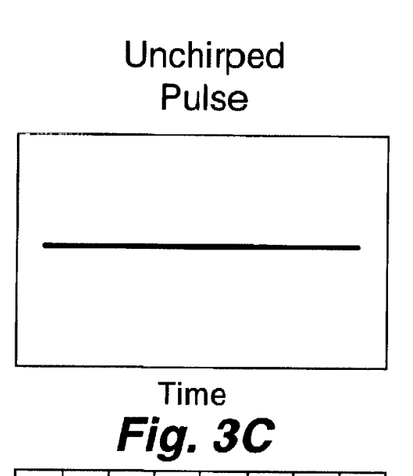
Figure 3D:
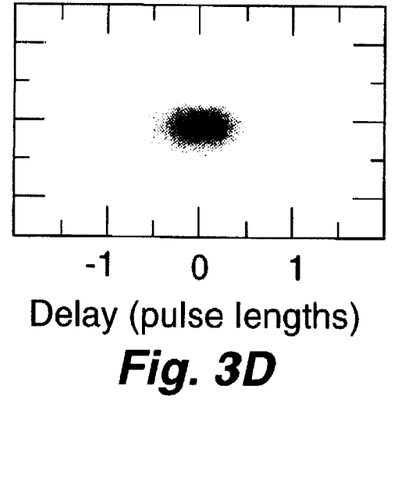
Figure 3E:
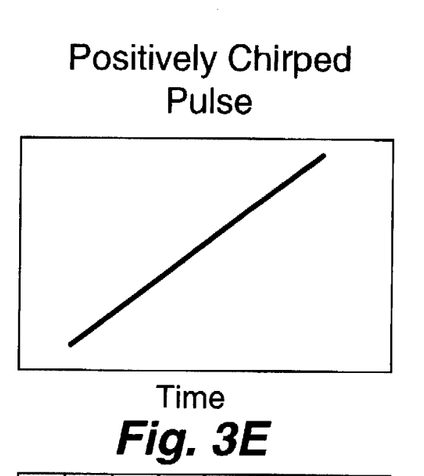
Figure 3F:
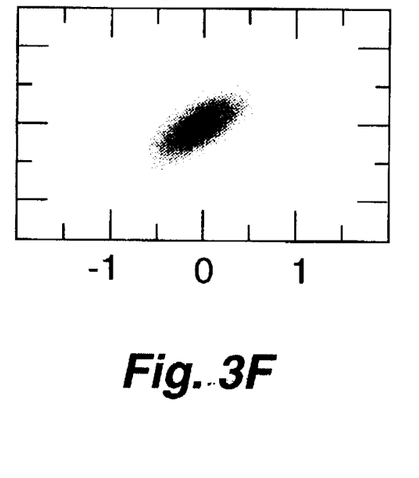

Referring again to FIG. 1, in accordance with the present invention the diffracted pulse is directed by output optics 28 to a wavelength-selective device 32, e.g., a spectrometer, to resolve the frequency components in the selected temporal slice of probe pulse 13. Camera 34 records the spectrum as a function of time delay of probe pulse 13 to produce an intensity plot vs. frequency and delay. FIGS. 3A–3F graphically illustrate the output results for various characteristics of femtosecond pulse 12. FIG. 3A depicts a negatively chirped pulse, i.e., a pulse with decreasing frequency with time; FIG. 3C depicts an unchirped pulse, i.e., a constant frequency pulse; and FIG. 3E depicts a positively chirped pulse, i.e., a pulse with increasing frequency with time. FIGS. 3B, 3D, and 3F are the corresponding camera 34 records of intensity as a function of frequency and delay and illustrate that the present technique uniquely and directly determines the phase characteristics of the femtosecond pulse. As hereinafter shown, these plots further contain all of the information necessary to reconstruct the intensity and phase characteristics of the incident pulse.

By way of example, a system according to FIG. 1 was constructed to measure a Rhodamine-6G colliding-pulse mode-locked laser producing <100-fsec pulses at a repetition rate of about 100 MHz amplified to an energy of about 200 µJ. A beam splitter 14 and neutral density filters (not shown) yielded two pulses of about 6 µJ each. A high quality variable delay 18, with a resolution of 1 µm, produced the variable delay for one pulse train. A lens 24 with a focal length of 1-m focused and crossed the two beams at an angle of about 0.5°. The electronic Kerr effect in a 3-mm thick BK-7 window placed at the focus of these two beams provided self-diffraction with about $10^{-4}$ efficiency. The peak intensity at the BK-7 window was approximately 100 GW/cm$^2$. The diffracted beam 26 was attenuated (ND 1.0), reflected by mirrors 28, and focused onto the 50-µm slits of a ¼-m Jarrel Ash spectrometer 32. A Photometrics CCD camera collected the dispersed diffracted light, averaged over 20 shots. The diffracted intensity vs. wavelength was then output to a computer for analysis.

The above system was used to obtain diffracted-pulse spectra at eleven different delays at 67-fsec intervals using the unrecompressed, positively chirped pulses of about 300-fsec width. The spectra clearly revealed a large wavelength chirp over the range of delays. From the measured diffracted-pulse wavelength vs. delay the approximate pulse wavelength vs. time was derived. Inverting this latter result yielded the pulse time and phase vs. wavelength, which, after inverse-Fourier transformation, yielded pulse intensity vs. time. This computed pulse intensity vs. time was in good agreement with an experimentally determined autocorrelation using conventional second-harmonic generation. The system has also been used with fully compressed, transform-limited pulses and pulses with negative chirp, with expected results in all cases.

Figure 4:
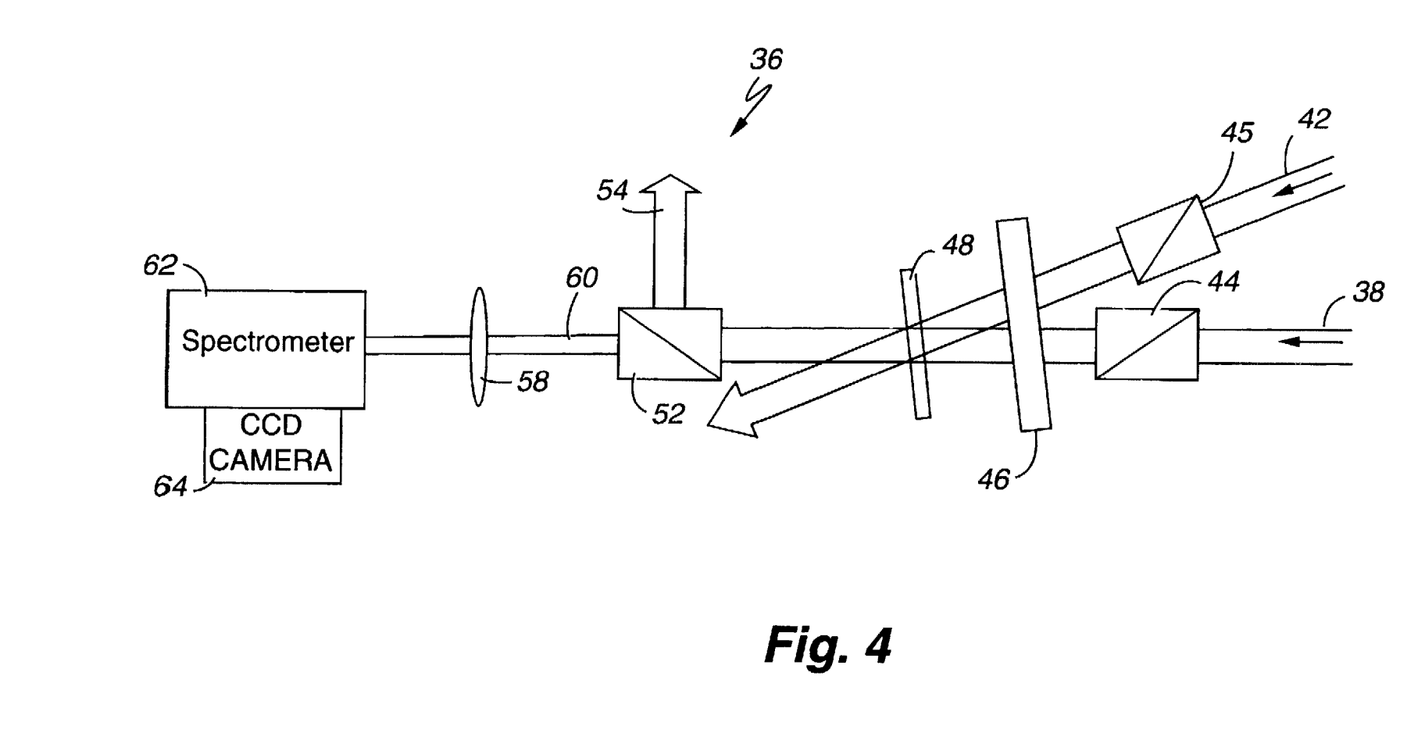
FIG. 4. schematically illustrates an ultrashort light pulse characterizing device according to a second embodiment of the present invention that can characterize a single pulse.

Another embodiment of an optical grating device useful for single pulse analysis is shown in FIG. 4 as FROG apparatus 36. Incoming pulses are provided as probe light pulse 38 and gate light pulse 42 as shown in FIG. 1, where probe light pulse 38 is an ultrashort light pulse whose pulse characteristics are to be determined. Gate pulse 42 may be formed from the same light pulse as pulse 38 or may originate from an independent source. Gate pulse 42 is polarized to 45° by polarizer 45 and probe pulse 38 is vertically polarized by polarizer 44. If gate pulse 42 is nominally polarized (more than about 90%), the polarization may be rotated 45° by changing the direction of the pulse by 90° after an initial change of direction, up or down, by 45°.

Polarized gate pulse 42 and probe pulse 38, which are propagating at an angle to one another, are overlapped into nonlinear optical medium 48. The effect of overlapping the pulses at an angle is to map a range of time delays between the two beams onto spatial coordinates within medium 46 to provide spatial resolution over the range of time delays. In other words, as shown in FIG. 4, the intersection of probe pulse 38 and gate pulse 42 in nonlinear medium 48 provides a portion where gate pulse 42 leads probe pulse 38 (the upper region as shown) and a portion where probe pulse 38 leads gate pulse 42 (the lower region as shown). In one embodiment, a cylindrical lens of focal length 10 cm focused the two beams to increase the intensity of the pulses at nonlinear medium 48 and increase the resulting signal 60 intensity. The two beams crossed at an angle of about 20°, yielding a range of delays of about 1.2 psec.

Signal light output from nonlinear medium 48 is input to polarizer 52, which rejects any component 54 of the vertically polarized probe pulse 38 and passes the signal pulse 60, which has horizontal polarization. Signal pulse 60 is then focused through imaging lens 58 into the input slit of imaging spectrometer 62. Spectrometer 62 forms an output intensity distribution vs. wavelength and time delay for recordation by CCD camera 64. It will be appreciated that crossing the beams at a large angle enables the characteristics of a single pulse to be determined since a range of delay times is inherent in the intersection of the beams. A cylindrical lens may be used to increase signal intensity if needed.

Figure 5A:
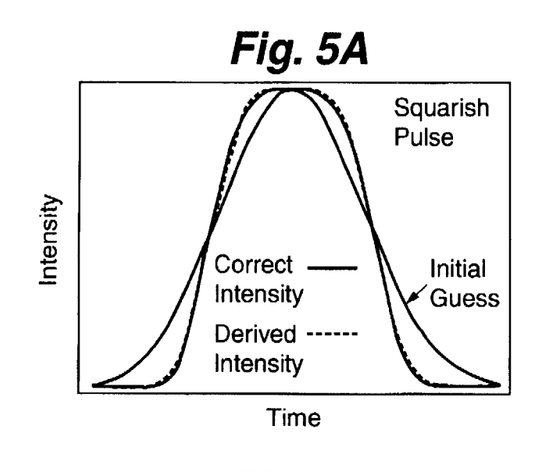
FIGS. 5A–5D graphically depict theoretical derivations of pulse shape information using theoretical output according to the present invention.
Figure 5B:
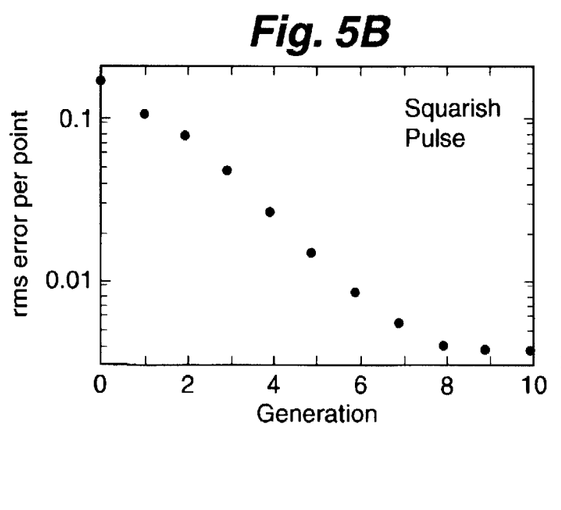
Figure 5C:
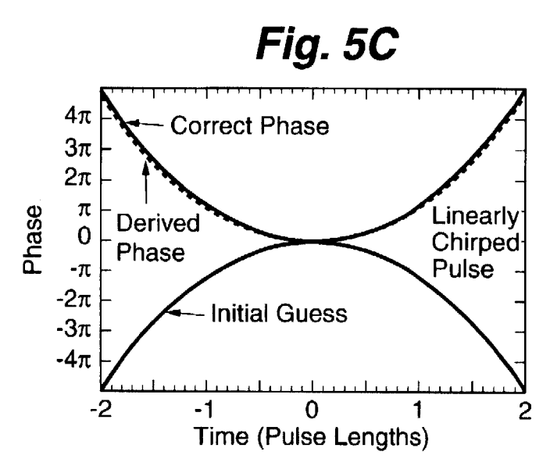
Figure 5D:
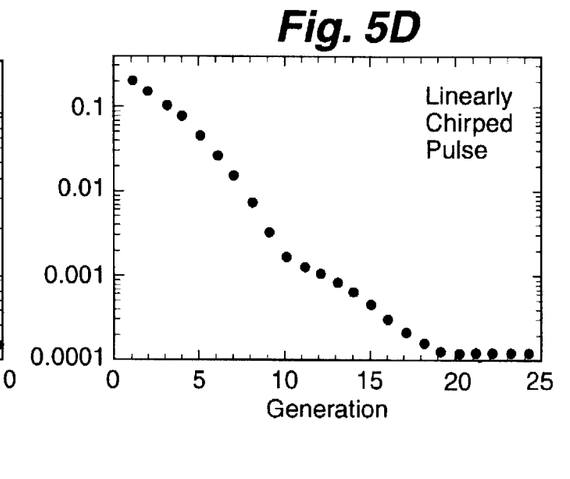

FIGS. 5A through 5D graphically illustrate the capability of the apparatus 36 shown in FIG. 4 and the algorithm of equations (1) through (6) to determine the characteristics of an ultrashort light pulse. FIGS. 5A–5D show theoretical results using the algorithm for two commonly encountered ultrashort pulses, (1) a nearly square pulse intensity with linear chirp (FIGS. 5A and 5B) and (2) a Gaussian intensity with positive linear chirp (FIGS. 5C and 5D). FIG. 5A illustrates an initial guess for a pulse shape involving the correct phase but a Gaussian intensity and the iterative evolution to a pulse shape that is very nearly the correct pulse shape. FIG. 5B illustrates the relatively rapid convergence of the algorithm. FIG. 5C illustrates an initial guess involving the correct intensity, but with a very bad estimate of the phase, i.e., the correct magnitude but opposite sign. Again, as shown in FIG. 5D, the algorithm converged to the correct phase in relatively few iterations.

Figure 6A:
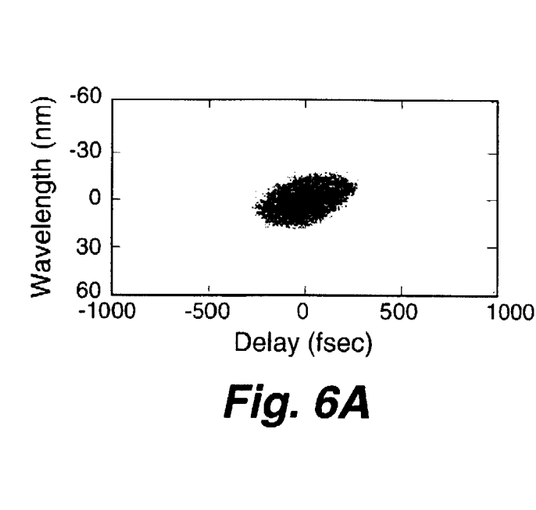
FIGS. 6A–6D graphically depict an actual FROG output and derived pulse shape and phase information using noise as an initial guess.
Figure 6B:
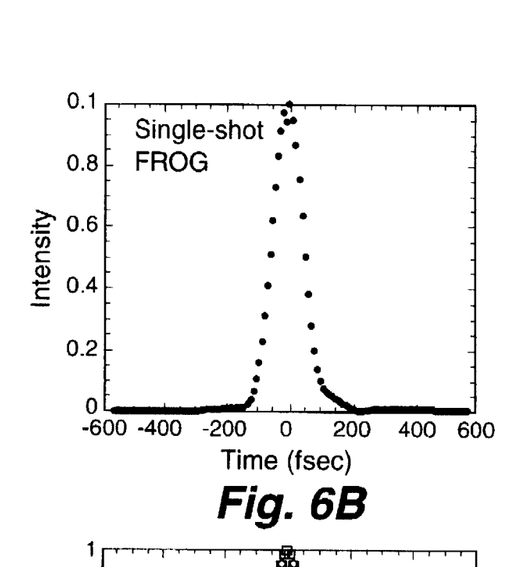
Figure 6C:
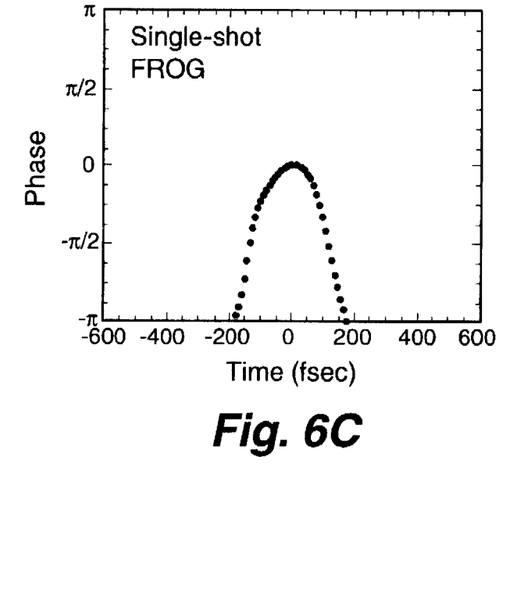
Figure 6D:
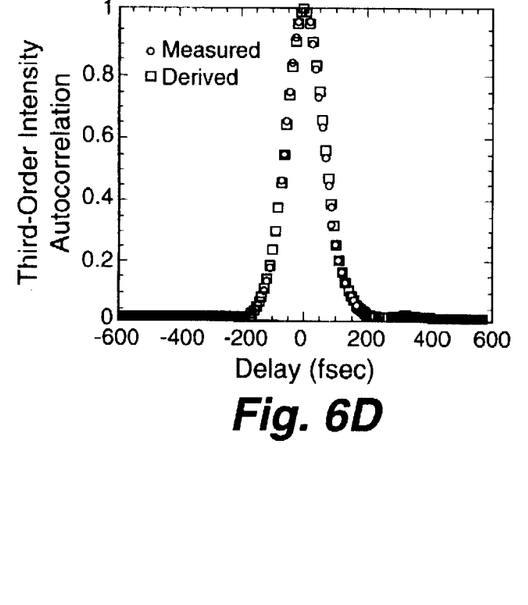

A FROG output for an actual single positively chirped pulse about 100-fsec in duration is shown in FIG. 6A. The positive chirp is clearly seen. FIGS. 6B and 6C illustrate the pulse characteristics I(t) and φ(t). Use of the algorithm on FIG. 6A data points extracts the pulse shape I(t) shown in FIG. 6B with a pulse width of about 110-fsec (FWHM). Noise was used as the initial guess for the pulse and convergence occurred in 50 iterations. The derived phase evolution φ(t) is shown in FIG. 6C. The inverted parabolic shape indicates positive chirp, that is, linearly increasing frequency vs. time, as also indicated by FIG. 6A. As a check of the FROG output, the pulse third-order intensity autocorrelation was computed and compared with the simultaneously obtained experimental third-order intensity autocorrelation obtained by integrating the FROG output over frequency for a given value of the delay. A good agreement between the computed and measured values is apparent from FIG. 6D.

Thus, a method and apparatus for determining the intensity and phase of femtosecond pulses using a frequency resolved optical gating has been described herein. The FROG technique is relatively simple to implement, has zero or negligible phase-mismatch, and is very broadband. Also, the technique is well-suited to the UV spectral range of femtosecond pulses since diffraction efficiencies are relatively high in that wavelength range.

The technique according to the present invention is particularly adapted to single shot measurements rather than the "average" measurements required in the prior art. It will be understood, however, that multishot pulse trains can be analyzed according to the method and apparatus described herein. In the case of a multishot pulse train, the derived intensity and phase information is the average intensity and phase of the pulse train and not the intensity and phase of any single pulse.

As used herein, the term "ultrashort" refers to pulse durations shorter than a few tens of picoseconds. These are the pulses of interest to measure and are well within the regime of pulses that can be analyzed from the FROG data. Long pulses can also be analyzed according to the present invention, but such pulses can be easily analyzed using existing technology. It should be noted that there is no fundamental limit to the wavelength of the pulse to be measured. Limiting factors are the detectors and spectrometers and not the FROG technique. Thus, the above technique may be used, for example, in the vacuum UV and x-ray regions of the spectrum when suitable detectors and nonlinear materials become available.

As noted, the preferred form of light pulse is a laser light pulse since laser light is generally coherent. In principle, any ultrashort light pulse can be measured using FROG. Practically speaking, however, any ultrashort light pulse with enough intensity to be measured via FROG will be produced in some way by a laser. Further, any lack of spatial coherence may degrade the quality of the measurement. The temporal response of the nonlinear optical medium is loosely referred to as an instantaneous response. The desired material should have a response that is faster than the duration of the pulse, although a response on the order of the pulse duration can be accommodated.

A preferred nonlinearity is associated with $x^{(3)}$ since it provides relatively higher signal levels. Any odd x will provide the same information, but with weaker signals. Even x's will not provide information on even phase distortions, but information on odd phase distortions may have use in some applications.

The preferred embodiments described herein use a single light pulse to form both a probe pulse and a gate pulse. It will be understood that the probe pulse and the gate pulse may originate from independent ultrashort light pulses. Then, the pulse shape, i.e., intensity vs. time of an independent gate pulse must be known.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for measuring the intensity and phase of a light pulse, comprising the steps of:

inputting said light pulse to form a probe pulse;

providing a gate pulse having a variable time delay;

combining said gate pulse and said probe pulse within an instantaneously responding nonlinear medium to form a signal pulse functionally related to a temporal slice of said probe pulse corresponding to the time delay between said probe pulse and said gate pulse;

inputting said signal pulse to a wavelength selective device to output signal pulse field information comprising signal intensity vs. frequency for a first value of said time delay; and varying said time delay over a range of values effective to yield an intensity plot of signal intensity vs. frequency and delay.

2. A method according to claim 1, further including the steps of extracting the shape of said light pulse as intensity vs. time and phase vs. time from said pulse field information.

3. A method according to claim 1, wherein said gate pulse is formed by splitting said light pulse to form said gate pulse and said probe pulse.

4. A method according to claim 1, further including the step of relatively polarizing said gate pulse and said probe pulse.

5. A method according to claim 1, wherein said step of combining said gate pulse and said probe pulse into said nonlinear medium includes the step of mapping a relative time delay between said gate pulse and said probe pulse onto spatial coordinates where the intersection of said gate pulse and said probe pulse in said nonlinear medium represents a range of delay times between said gate and probe pulses.

6. A method according to claim 4, further including the steps of extracting the shape of said light pulse as intensity vs. time and phase vs. time from said pulse field information.

7. A method according to claim 5, wherein said gate pulse is formed by splitting said light pulse to form said gate pulse and said probe pulse.

8. A method according to claim 4, wherein said step of combining said gate pulse and said probe pulse into said nonlinear medium includes the step of mapping a relative time delay between said gate pulse and said probe pulse onto spatial coordinates where the intersection of said gate pulse and said probe pulse in said nonlinear medium represents a range of delay times between said gate and probe pulses.

9. A method according to claim 8, further including the steps of extracting the shape of said light pulse as intensity vs. time and phase vs. time from said pulse field information.

10. A method according to claim 8, wherein said gate pulse is formed by splitting said light pulse to form said gate pulse and said probe pulse.

11. A method according to claim 2, wherein said steps of extracting said shape of said light pulse further comprises the steps of:

forming an initial guess $E^{(0)}(t)$ to represent said light pulse;

calculating an iteration of $E^{(0)}{}_{sig}(t,\tau)$ from $E^{(0)}(t)$;

transforming said iteration of $E^{(0)}{}_{sig}(t,\tau)$ to $E^{(0)}{}_{sig}(\omega,\tau)$;

replacing the magnitude of $E^{(0)}{}_{sig}(\omega,\tau)$ with the square root of the measured value of $I_{FROG}(\omega,\tau)$ and performing an inverse Fourier transform to provide a replacement function $E^{(1)}(t)$ for said initial guess; and performing the above steps until said replacement function $E^{(1)}(t)$ converges to a final function.

12. A method according to claim 6, wherein said steps of extracting said shape of said light pulse further comprises the steps of:

forming an initial guess $E^{(O)}(t)$ to represent said light pulse;

calculating an iteration of $E^{(O)}_{sig}(t,\tau)$ from $E^{(O)}(t)$;

transforming said iteration of $E^{(O)}_{sig}(t,\tau)$ to $E^{(O)}_{sig}(\omega,\tau)$;

replacing the magnitude of $E^{(O)}_{sig}(\omega,\tau)$ with the square root of the measured value of $I_{FROG}(\omega,\tau)$ and performing an inverse Fourier transform to provide a replacement function $E^{(1)}(t)$ for said initial guess; and performing the above steps until said replacement function $E^{(1)}(t)$ converges to a final function.

13. A method according to claim 9, wherein said steps of extracting said shape of said light pulse further comprises the steps of:

forming an initial guess $E^{(O)}(t)$ to represent said light pulse;

calculating an iteration of $E^{(O)}_{sig}(t,\tau)$ from $E^{(O)}(t)$;

transforming said iteration of $E^{(O)}_{sig}(t,\tau)$ to $E^{(O)}_{sig}(\omega,\tau)$;

replacing the magnitude of $E^{(O)}_{sig}(\omega,\tau)$ with the square root of the measured value of $I_{FROG}(\omega,\tau)$ and performing an inverse Fourier transform to provide a replacement function $E^{(1)}(t)$ for said initial guess; and performing the above steps until said replacement function $E^{(1)}(t)$ converges to a final function.

14. Apparatus for measuring the intensity and phase of a light pulse, comprising:

means for inputting said light pulse to form a probe pulse;

means for inputting a gate pulse;

delay means for variably delaying said gate pulse;

combining means for overlapping said gate pulse and said probe pulse;

an instantaneously responding medium located for receiving said combined pulses and outputting a signal pulse functionally related to said combined pulses; and a wavelength-selective device for receiving said signal pulse and spectrally resolving said signal pulse into signal intensity vs. wavelength.

15. Apparatus according to claim 14, further including polarization means for relatively polarizing said gate pulse and said probe pulse.

16. Apparatus according to claim 14, further including means for splitting said light pulse to form said gate pulse and said probe pulse.

17. Apparatus according to claim 14, wherein said combining means comprises means for propagating said gate pulse and said probe pulse at an angle therebetween to map delay times onto separated spatial coordinates in said medium.

18. Apparatus according to claim 17, further including means for splitting said light pulse to form said gate pulse and said probe pulse.

19. Apparatus according to claim 14, wherein said wavelength-selective device includes imaging means for receiving said signal pulse and forming an image to display signal intensity vs. wavelength and delay.

* * * * *

UNITED STATES PATENT AND TRADEMARK OFFICE
CERTIFICATE OF CORRECTION

PATENT NO. : 5,754,292
DATED : 5/19/98
INVENTOR(S) : Kane et al.

It is certified that error appears in the above-identified patent and that said Letters Patent is hereby corrected as shown below:

Column 1, line 17, "has" should read --have--.

Column 2, line 28, after "of" insert --a--.

Column 5, line 36, after "14" insert --(Figure 1)--.

Column 6, line 16, replace "46" with --48--.

Column 6, line 23, after "lens" insert --46--.

Signed and Sealed this

Ninth Day of February, 1999

Attest:

Attesting Officer

Acting Commissioner of Patents and Trademarks